United States Patent Office 3,551,823
Patented Dec. 29, 1970

3,551,823
ELECTRICAL PULSE DECODERS
Michael Charles Stevens, London, England, assignor to
A. C. Cossor Limited, Harlow, Essex, England
Filed Mar. 1, 1968, Ser. No. 709,577
Claims priority, application Great Britain, Apr. 24, 1967,
18,826/67
Int. Cl. H03k 5/00
U.S. Cl. 328—119                                4 Claims

ABSTRACT OF THE DISCLOSURE

In order to reduce the uncertainty in the delay provided by a single shift register in a pulse decoder to half a clock period instead of one clock period a different pattern is entered into the register depending upon which half of the clock period a first input pulse occurs. Further along the register different gating arrangements detect the two different patterns and provide respective outputs of which one is half a clock period delayed relative to the other. The output thus provided is compared with the second input pulse in the conventional manner.

---

This invention relates to pulse decoders of the type in which a shift register delays a first signal to provide a delayed signal which is tested for coincidence with a second signal to determine whether the correct time spacing exists between the first and second signals. Such pulse decoders are used inter alia in secondary radar transponders.

The precise timing of the delayed signal is determined by the phase of the clock signal used to move on the shift register and the indeterminacy of the phase of the first signal relative to the clock signal may be large enough to prevent the delayed signal from commencing and terminating at instants which are sufficiently determinate having regard to the required tolerances for accepting the second signal as having the correct spacing from the first.

For example a secondary surveillance radar interrogator has a number of modes of interrogation distinguished by the spacing between two pulses, which are nominally 3, 5, 8, 17, 21 and 25 microseconds ($\mu$s.). For some time International requirements were that, if an aircraft receiver was set to respond to a given mode it had to respond if the pulse spacing was within +0.2 $\mu$s. of the nominal, but was not to respond if the spacing was more than ±1 $\mu$s. of the nominal. Thus with 8 $\mu$s. nominal spacing the receiver had to respond if the spacing was between 7.8 and 8.2 $\mu$s. However, if clock-pulses of 1 $\mu$s. period were used, there could be an output from 6.8 to 9.2 $\mu$s. (i.e. 7.8−1 $\mu$s. to 8.2+1 $\mu$s.) due to the uncertainty of delay. As a result pulses outside the limit of ±1 $\mu$s. spacing could be decoded and this was unacceptable.

One known method of reducing the uncertainty of delay is to use two shift registers and apply clock pulses of equal period but in antiphase. This reduces the uncertainty to half the clock pulse period if an output is taken from an OR gate coupled to the outputs of the registers, the input pulses are of a certain duration in relation to the clock pulses, and the first stage of each register is set only if a clock pulse and an input pulse overlap. This method will not be described in detail, but its main disadvantage is that two registers are required.

The object of the present invention is to reduce the uncertainty in location of the delayed pulse from one clock period to part of a clock period using only one register delay line.

According to the present invention there is provided a pulse decoder comprising a shift register having a plurality of stages and a source of clock pulses therefor arranged to shift a first input pulse along the register a certain number of stages and thereby delay the first input pulse by a predetermined interval, and means for testing for coincidence between the delayed output pulse and a second input pulse, wherein the input stage of the shift register is arranged so to respond to an input pulse and a clock pulse signal that a different pattern of set stages is established when the input pulse has different phases relative to the clock pulse signal, and gating arrangements so connected to a plurality of register stages and the clock pulse source as to provide a delayed output pulse during the different phases of the clock pulse signal in response to the different patterns of set stages.

Preferably the clock pulse source provides a rectangular waveform, with half-cycles of equal duration, and substantially equal to, or an odd submultiple of, the duration of the input signals. The pattern set up will then depend, as indicated below, on whether the input pulse was received during the first or second half of each clock-pulse cycle. If, in the usual convention, one state of the stages is denoted "1" and the other state "0", the pattern will then depend on the number of "1's" following one another in succession along the register.

An input circuit may be provided for generating a first set pulse which is short compared with the clock-pulse period when an input pulse is applied thereto, the first set pulse being applied to set the first register stage, and for generating a second set pulse if the input pulse is applied during the second half of the clock-pulse period, the second set pulse being applied to set the first stage after the state set by the first set pulse has been transferred to the second stage.

If a stage is in the "1" state a output corresponding to a "1" will be obtained at an output designated Q, and an output corresponding to a "0" will be obtained at another output designated $\bar{Q}$, and vice versa if the stage is in its "0" state.

If half cycles of the clock-pulse waveform are of the same duration as the input pulses, and it is desired that an input pulse applied during any part of the clock-pulse waveform should give an output signal after a nominal delay of an integral number $n$ of clock-pulse periods with an uncertainty of half a cycle, then the gating arrangements may comprise a first AND gate with inputs connected to the Q output of the $n+1^{\text{th}}$ stage, the $\bar{Q}$ output of the $n^{\text{th}}$ stage, and the clock-pulse generator, the first gate being enabled when the second half cycle of the clock-pulse waveform is reached, and a second AND gate with inputs connected to the Q outputs of the $n+1^{\text{th}}$ and $n+2^{\text{th}}$ stage.

The delayed output pulse can be stretched by a monostable device to yield a delayed signal of the required length.

Certain embodiments of the invention will not be described, by way of example, with reference to the accompanying drawings in which.

Figure 1:
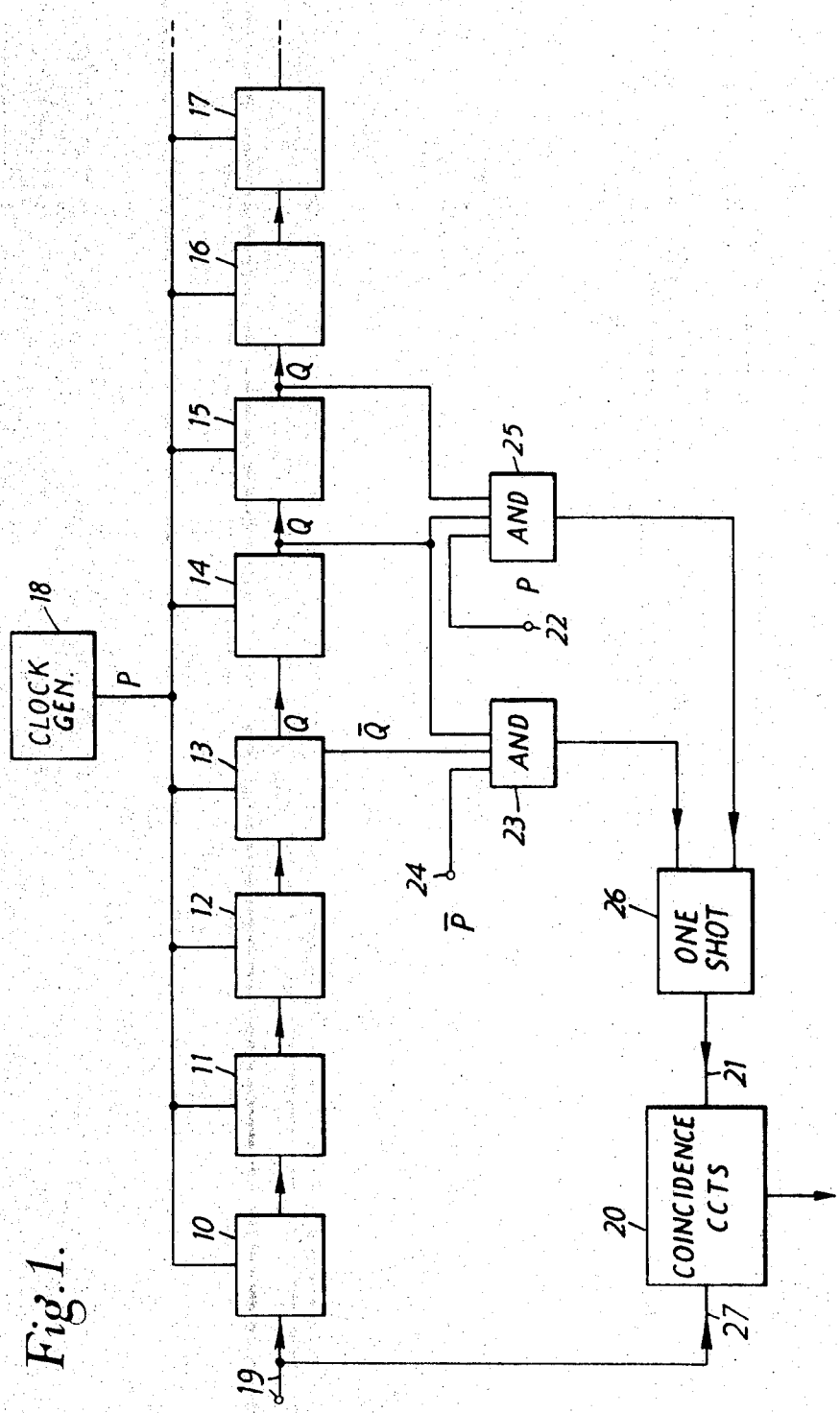
FIG. 1 is a block diagram of a pulse decoder according to the invention.

In FIG. 1, a shift register comprises bistable stages 10 to 17, to which clock pulses P of rectangular waveform, equal duration half cycles, and a period of 1 $\mu$s., are applied from a generator 18. Negative-going input pulses of duration 0.5 $\mu$s. are applied at a terminal 19 and pass to coincidence circuits 20, and to the first stage 10 of the register, setting the Q output of the first stage to "1." Eventually, in a way which will be described, a corresponding pulse with a certain delay arrives at the coincidence circuits 20 by way of a connection 21.

Each time the clock waveform goes positive, a "1"

at a Q output of one stage is transferred to the corresponding output of the next stage. If the leading edge of an input pulse is applied to the stage 10 during the first half of a clock-pulse cycle the trailing edge of the pulse will occur before the clock waveform goes positive, and the Q output of this stage will be set to "1" once only. If the leading edge of an input pulse occurs during the second half of a clock-pulse cycle its trailing edge will occur after a "1" has been transferred to the second stage 11 and the Q output of the first stage 10 will be again set to "1," this second "1" being transferred the next time the clock-pulse waveform goes positive.

In this way input pulses arriving during the first half of the clock waveform will code the information entered in the register to a "1" followed by a "0," and pulses arriving during the second half of the clock waveform will enter the code "1."

The arrangement shown in FIG. 1 has a nominal delay of 4 µs. to the outputs of AND gates 23 and 25. If an input pulse is applied in the first half of the clock-pulse cycle, then after the clock waveform has gone positive four times the Q output of stage 14 will be "1," as will the $\bar{Q}$ output of stage 13, and the AND gate 23 has two of its required input signals 3.5 to 4 µs. after the input signal was applied. The third input for the AND gate 23 is the antiphase or inverted clock signal $\bar{P}$ obtained from the clock generator 18 and applied to a terminal 24. Hence the third input is present when the clock waveform goes negative, that is 0.5 µs. after the other three inputs were applied. The AND gate 23 therefore gives an output signal with a 4 to 4.5 µs. delay.

With an input signal in the second half of the clock-pulse cycle, after the clock waveform has gone positive five times the Q outputs of stages 14 and 15 will be "1." Thus after 4 to 4.5 µs. delay an output signal will be provided at the AND gate 25. A clock pulse P can be provided at the terminal 22 to limit the duration of the output from the gate 25 if required.

The uncertainty of delay from AND gates 23 and 25 is 0.5 µs. but an input can be applied at any time during a clock waveform of period 1 µs.

In the arrangement of FIG. 1 delay is adjusted in two ways according to the coding of information entered into the register. Firstly, the output is taken from different stages—the stages 13 and 14 for signals entered in the first half of the clock-pulse cycle, and the stages 14 and 15 for signals entered in the second half of the clock-pulse cycle. It will be apparent that any delay equivalent to an integral number of clock-pulse cycles could have been provided so long as sufficient bistable stages were provided, and logic circuits, such as the gate 23 or 25, were connected to the appropriate stages. Secondly, delay is provided by causing the AND gate 23 to give an output after waiting for a certain part of the clock waveform. Delays of fractions of the clock-pulse period, or larger delays can be obtained in other ways, for example by adding a further delay circuit after an AND gate.

The AND gates 23 and 25 are coupled to a monostable circuit 26, i.e. a one shot multivibrator, which applies a signal to the coincidence circuits for 1.3 µs. after being triggered. If a second pulse is applied by way of a connection 27 to the coincidence circuits, nominally 5 µs. but in fact 4.5 to 5.3 µs. (i.e. 4+1.3 µs.) after the first pulse was applied to the stage 10, the coincidence circuits will provide an output. The pulse applied through the connection 21 may also appear between 4 and 4.5 µs. and between 5.3 and 5.8 µs. after application to the stage 10. Outputs are obtained from the coincidence circuits under the same conditions as from the aforementioned known decoder which has two registers, but the single register has one more stage than each of the two registers. The decoder of FIG. 1 satisfies a limit for the nominal 5 µs. quoted above. It will be apparent how the circuit of FIG. 1 can be applied to pulse spacings of for instance 8, 17, 21 and 25 µs., which represent the civil modes in current use.

If the duration of the input pulses was equal to three half cycles of the clock waveform, that is 1.5 µs. in this example, a code would again be entered in the register which could be used to vary delay. For example, an input pulse applied during the first half of the clock-pulse cycle would enter two ones, since its trailing edge would remain after the clock waveform went positive once, and an input pulse applied during the second half of the clock waveform would enter three ones, since its trailing edge would remain after the clock waveform went positive twice. Different AND gates forming a gating arrangement would be required to provide outputs at the correct times, but in view of the explanation given it is easy to see how this logic would be constructed.

Similarly, if the input pulses were any odd integral number of half clock-pulse cycles in duration, the code entered into the register would enable delay to be accorded as required.

Figure 2:
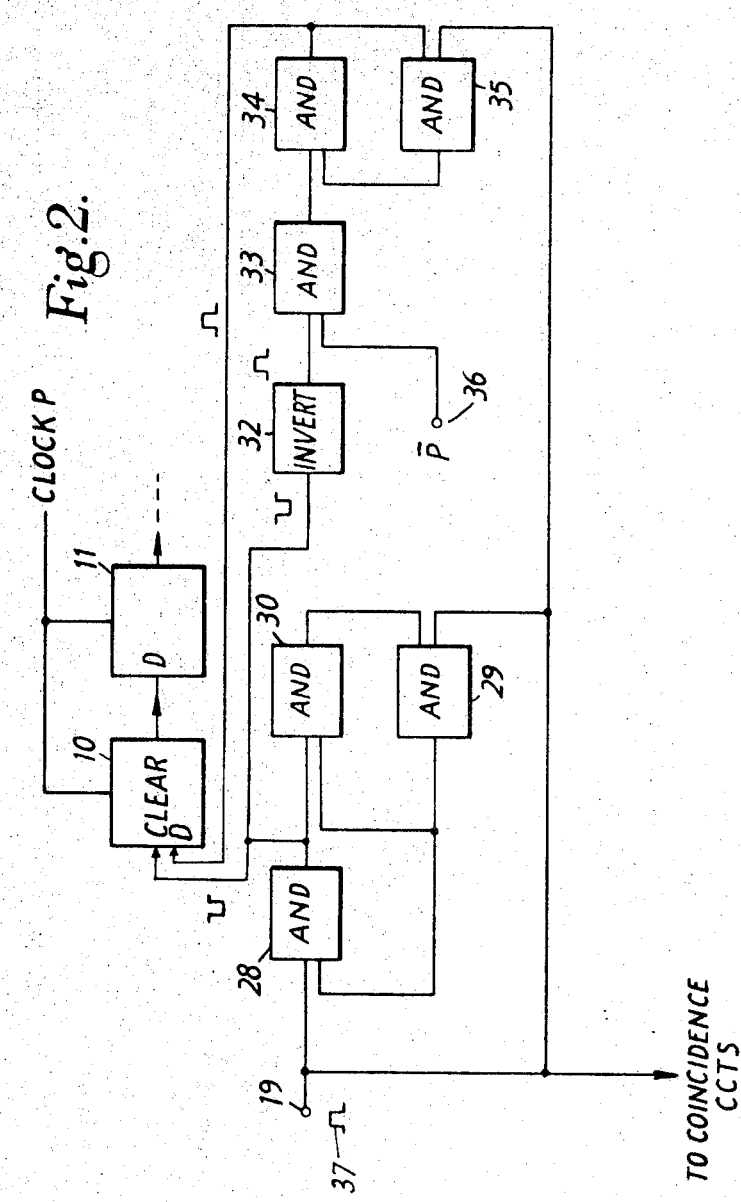
FIG. 2 is a block diagram of logic which can be used in a modified form of the decoder of FIG. 1.

As a practical matter it is expected that for a clock pulse period of 1 µs. input pulses must be between 0.5 and 0.6 µs. in duration. At any rate the duration of input pulses must be closely controlled in the embodiment of FIG. 1. FIG. 2 shows an arrangement for passing pulses to the first stage 10 in which input pulses need not be of precise duration.

An input pulse, such as that shown at 37, is applied to an input terminal 19 which forms the input terminal to the decoder. All the AND gates of FIG. 2 provide a negative output if all their inputs are positive, but for all other input combinations their output is positive.

Consider the state of AND gates 28, 29 and 30 when no input pulse is applied. The gates 28 and 29 have one negative input, that connected to the terminal 19, so their outputs are positive. Thus the gate 30 receives two positive inputs and its output is negative. On arrival of a positive input pulse at terminal 19 the gate 28 is enabled and a negative pulse at its output sets to "1" the Q output of the register stage 10. The gate 30 provides a positive output on receiving the negative input, therefore the gate 29 provides a negative output and consequently removes one positive input from the gate 28, so terminating the negative pulse applied to the stage 10. Thus a pulse which is short compared with the clock cycle is applied to the clear input of the stage 10, setting this stage to "1." Provided the recovery time of the gates 29 and 30 is such that the gate 29 does not provide a negative output again until the input pulse has terminated the gate 28 will not be opened again during the input pulse.

Consider the state of the gates 32 to 35 before an input pulse is applied at the terminal 19. A positive input is applied to the gate 32 which acts as an inverter and applies a negative input to the gate 33 making its output positive. The gate 35 has a negative input and thus it also applies a positive input to the gate 34 which opens, applying a negative input to the D or data input of the stage 10. The D input requires a positive pulse in the presence of a clock pulse to set the Q output to "1." At this time therefore the gate 34 does not enter a "1" line in the stage 10. As has been described, when a positive input pulse is applied at the terminal 19 a negative pulse appears at the input to gate 28 and therefore also at the input to gate 32. During the second half of each clock-pulse cycle a positive input from $\bar{P}$ is applied to a terminal 36 forming the second input to gate 33. Thus if an input pulse is applied during the second half of the clock cycle the gate 33 is opened, the gate 34 is closed and a positive pulse is applied to the D input of the stage 10, to enter a second "1" therein. The gate 35 now receives two positive inputs and also applies a negative input to the gate 34. When the short pulse from the gate 28 terminates the gate 34 remains closed until after the input pulse has terminated. Thus so long as the input pulse is longer than half the clock period the Q output of the stage 10 is set again to "1," and two "1's" are propagated by the register, as in the arrangement of FIG. 1, only if the input pulse is applied in the second half of the clock period.

Although input pulses must now be more than half a clock cycle in duration there is no limit to their length so long as they do not interfere with the next input pulse. The output gating arrangements of this embodiment can be as in FIG. 1.

What I claim is:

1. A pulse decoder comprising a shift register having a plurality of stages and a source of clock pulses therefor arranged to shift a first input pulse along the register a certain number of stages and thereby delay the first input pulse by a predetermined interval, and means for testing for coincidence between the delayed output pulse and a second input pulse, characterised by the improvement wherein the shift register comprises an input circuit jointly responsive to an input pulse and a clock pulse signal to set a first number of stages of the shift register when the input pulse commences in one phase of the clock pulse signal and to set a second number of stages, different from the first number, when the input pulse commences in another phase of the clock pulse signal, and gating arrangements connected to a plurality of register stages and the clock pulse source and responsive to the appearance of the first number of set stages among the last said plurality of stages and the presence of the said one phase to provide a delayed output pulse in the said one phase and further responsive to the appearance of the second number of set stages among the last said plurality of stages and the presence of the said other phase to provide a delayed output pulse in the said other phase.

2. A pulse decoder according to claim 1, wherein the clock pulse source provides a rectangular waveform, with half-cycles of equal duration and substantially equal to, or an odd sub-multiple of, the duration of the input pulses, the first stage of the shift register being responsive to an input pulse to set on the appearance thereof and further responsive to a predetermined one of the rising and falling edges of the rectangular waveform to be reset on the first such edge following termination of the input pulse, each stage of the shift register being responsive to the said predetermined edge to assume the stage of the preceding stage.

3. A pulse decoder according to claim 1, wherein said input gating circuit comprises means responsive to first input pulses commencing during different phases of the clock pulses to emit different numbers of setting pulses which are effective to enter "1's" in the input stage of the shift register.

4. A pulse decoder according to claim 1, wherein each of the said gating arrangements provides a delayed output pulse whose duration equals one phase of the clock pulse period and comprising means for stretching the delayed output pulses.

References Cited

UNITED STATES PATENTS 3,047,806  7/1962  Heslop _____ 328—119

DONALD D. FORRER, Primary Examiner

J. D. FREW, Assistant Examiner

U.S. Cl. X.R.

307—221, 234; 328—37, 55, 110